United States Patent
Schade (10) Patent No.: US 8,812,472 B2
(45) Date of Patent: *Aug. 19, 2014

(54) ABSTRACT DATABASE QUERY

(71) Applicant: AT&T Intellectual Property I, L.P., Atlanta, GA (US)

(72) Inventor: Adam Schade, St. Lous, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/890,650

(22) Filed: May 9, 2013

(65) Prior Publication Data

US 2013/0246459 A1   Sep. 19, 2013

Related U.S. Application Data

(63) Continuation of application No. 12/639,180, filed on Dec. 16, 2009, now Pat. No. 8,468,141.

(51) Int. Cl.
*G06F 17/30* (2006.01)

(52) U.S. Cl.
USPC ............................ 707/705; 707/790; 707/802

(58) Field of Classification Search
USPC ......................................... 707/705, 790, 802
See application file for complete search history.

(56) References Cited

U.S. PATENT DOCUMENTS

| | | | |
|---|---|---|---|
| 5,807,175 A | 9/1998 | Davis et al. | |
| 5,809,329 A | 9/1998 | Lichtman et al. | |
| 5,819,107 A | 10/1998 | Lichtman et al. | |
| 6,243,738 B1 | 6/2001 | Hayles et al. | |
| 6,269,481 B1 | 7/2001 | Perlman et al. | |
| 6,336,152 B1 | 1/2002 | Richman et al. | |
| 6,591,272 B1 * | 7/2003 | Williams | 1/1 |
| 2003/0005282 A1 | 1/2003 | Bade | |
| 2003/0033517 A1 * | 2/2003 | Rutherglen et al. | 713/153 |
| 2003/0140257 A1 | 7/2003 | Peterka et al. | |
| 2004/0015440 A1 | 1/2004 | Lai et al. | |
| 2004/0046014 A1 | 3/2004 | Russell et al. | |
| 2004/0210629 A1 * | 10/2004 | Klindt et al. | 709/202 |
| 2005/0236483 A1 | 10/2005 | Wilz et al. | |
| 2006/0150148 A1 * | 7/2006 | Beckett et al. | 717/109 |
| 2006/0213969 A1 | 9/2006 | Russell et al. | |

(Continued)

OTHER PUBLICATIONS

"Load JDBC Driver and Get Connected", DbVisualizer 6.5, Oct. 2008, pp. 1-22, URL: http://www.minq.se/products/dbvis/doc/main/doc/ug/getConnected/getConnected.html, downloaded no later than Nov. 9, 2009.

"Java Database Connectivity", pp. 1-6, URL: http://en.wikipedia.org/wiki/jdbc, downloaded no later than Nov. 6, 2009.

(Continued)

*Primary Examiner* — Hanh Thai
(74) *Attorney, Agent, or Firm* — Greenblum & Bernstein, P.L.C.

(57) ABSTRACT

Systems, apparatuses, methods, and media for configuring a terminal to access a database are provided. The systems, apparatuses, methods, and media determine connection properties of the database. The database is accessible via a uniform resource locator string. One of a plurality of database connectivity drivers that enables a connection with the database is determined based on the connection properties of the database. The one of the plurality of database connectivity drivers is provided to the terminal via a network. The one of the plurality of database connectivity drivers comprises the uniform resource locator string and is configured to establish the connection with the database via the network based on the uniform resource locator string to enable communication between the terminal and the database.

20 Claims, 4 Drawing Sheets

(56) References Cited

U.S. PATENT DOCUMENTS

2008/0250028 A1* 10/2008 Rutherglen et al. ............. 707/10
2009/0150578 A1    6/2009 Newman et al.
2011/0029946 A1*  2/2011 Joukov et al. ................. 717/100

OTHER PUBLICATIONS

JAR (file format), pp. 1-3, URL: http://en.wikipedia.org/wiki/Jar_file, downloaded no later than Oct. 6, 2009.

* cited by examiner

ABSTRACT DATABASE QUERY

CROSS REFERENCE TO RELATED APPLICATIONS

The present application is a continuation application of U.S. patent application Ser. No. 12/639,180, filed on Dec. 16, 2009. The disclosure of this document, including the specification, drawings, and claims, is incorporated herein by reference in its entirety.

BACKGROUND

1. Field of the Disclosure

The present disclosure relates to communication between a terminal and a database. More particularly, the present disclosure relates to a method for automatically determining and loading a driver that enables communication between the terminal and the database.

2. Background Information

Generally, a database contains specific connection information that specifies how information is to be entered to or extracted from the database. A database connectivity driver, such as a Java Database Connectivity (JDBC) driver, typically corresponds to the connection information. The JDBC driver is a client-side adaptor that converts requests from the client to a protocol that the database understands. The JDBC driver is generally a set of Java classes collected into a Java Archive (JAR) file.

Traditionally, a developer of the database provides the JAR file, which includes the corresponding JDBC driver, to the client. The JDBC driver is extracted from the provided JAR file and loaded onto the client. Thereafter, the client is able to communicate with the database.

DETAILED DESCRIPTION

In view of the foregoing, the present disclosure, through one or more of its various aspects, embodiments and/or specific features or sub-components, is thus intended to bring out one or more of the advantages as specifically noted below.

According to an embodiment of the present disclosure, a tangible computer-readable medium encoded with an executable set of instructions for accessing a database with a terminal includes: a detecting code segment that, when executed, detects connection properties of the database; a determining code segment that, when executed, automatically determines, based on the connection properties of the database and from a plurality of database connectivity drivers stored in a memory, one of the plurality of database connectivity drivers that enables communication with the database; and a loading code segment that, when executed, loads the one of the plurality of database connectivity drivers on the terminal to enable the terminal to communicate with the database According to one aspect of the present disclosure, the connection properties include at least one of a hostname, a port number, a database name, a user name, and a password.

According to another aspect of the present disclosure, the tangible computer-readable medium includes the memory that stores the plurality of database connectivity drivers. In this regard, the loading code segment loads the one of the plurality of database connectivity drivers on the terminal without the one of the plurality of database connectivity drivers being provided externally of the tangible computer-readable medium.

According to yet another aspect of the present disclosure, the tangible computer-readable medium further includes a connecting code segment that, when executed, establishes a connection between the terminal and the database based on a uniform resource locator of the database. The uniform resource locator of the database is pre-encoded in the tangible computer-readable medium for establishing the connection between the terminal and the database without requiring input of the uniform resource locator at the terminal.

According to still another aspect of the present disclosure, the loading code segment automatically loads and configures the one of the plurality of database connectivity drivers on the terminal in response to the determining code segment automatically determining the one of the plurality of database connectivity drivers.

According to an additional aspect of the present disclosure, the plurality of database connectivity drivers support at least My Structured Query Language, Oracle, DB2, and Structured Query Language Server.

According to another aspect of the present disclosure, the plurality of database connectivity drivers comprise a plurality of Java Archive files.

According to another embodiment of the present disclosure, a method for accessing a database with a terminal includes: detecting connection properties of the database; automatically determining, based on the connection properties of the database and from a plurality of database connectivity drivers stored in a memory, one of the plurality of database connectivity drivers that enables communication with the database; and loading the one of the plurality of database connectivity drivers on the terminal to enable the terminal to communicate with the database.

According to one aspect of the present disclosure, the connection properties include at least one of a hostname, a port number, a database name, a user name, and a password.

According to yet another aspect of the present disclosure, the terminal includes the memory that stores the plurality of database connectivity drivers, and the one of the plurality of database connectivity drivers is loaded on the terminal without the one of the plurality of database connectivity drivers being provided externally from terminal.

According to still another aspect of the present disclosure, the method further includes establishing a connection between the terminal and the database based on a uniform resource locator of the database. In this regard, the connection is established without requiring input of the uniform resource locator of the database at the terminal.

According to an additional aspect of the present disclosure, the one of the plurality of database connectivity drivers is automatically loaded and configured on the terminal in response to the automatically determining the one of the plurality of database connectivity drivers.

According to another aspect of the present disclosure, the plurality of database connectivity drivers support at least My Structured Query Language, Oracle, DB2, and Structured Query Language Server.

According to yet another aspect of the present disclosure, the plurality of database connectivity drivers comprise a plurality of Java Archive files.

According to another embodiment of the present disclosure, an apparatus for accessing a database with a terminal includes: a detector that detects connection properties of the database; a determiner that automatically determines, based on the connection properties of the database and from a plurality of database connectivity drivers stored in a memory, one of the plurality of database connectivity drivers that enables communication with the database; and a loader that loads the one of the plurality of database connectivity drivers on the terminal to enable the terminal to communicate with the database.

According to one aspect of the present disclosure, the connection properties include at least one of a hostname, a port number, a database name, a user name, and a password.

According to another aspect of the present disclosure, the apparatus further includes the memory that stores the plurality of database connectivity drivers. In this regard, the loader loads the one of the plurality of database connectivity drivers on the terminal without the one of the plurality of database connectivity drivers being provided externally from the apparatus.

According to still another aspect of the present disclosure, the apparatus further includes a connector that establishes a connection between the terminal and the database based on a uniform resource locator of the database. The uniform resource locator of the database is stored in the memory for establishing the connection between the terminal and the database without requiring input of the uniform resource locator at the terminal.

According to an additional aspect of the present disclosure, the plurality of database connectivity drivers support at least My Structured Query Language, Oracle, DB2, and Structured Query Language Server.

According to yet another aspect of the present disclosure, the plurality of database connectivity drivers comprise a plurality of Java Archive files.

Figure 1:
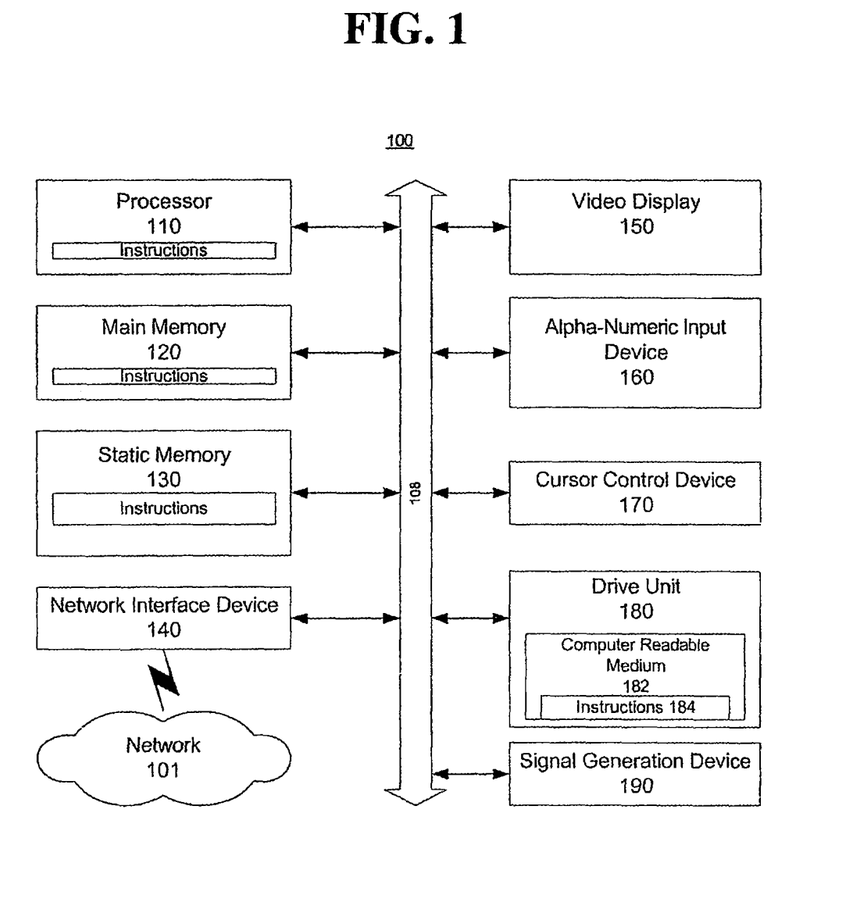
FIG. 1 shows an exemplary general computer system that includes a set of instructions for accessing a database with a terminal.

FIG. 1 is an illustrative embodiment of a general computer system, on which a method for accessing a database with a terminal can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
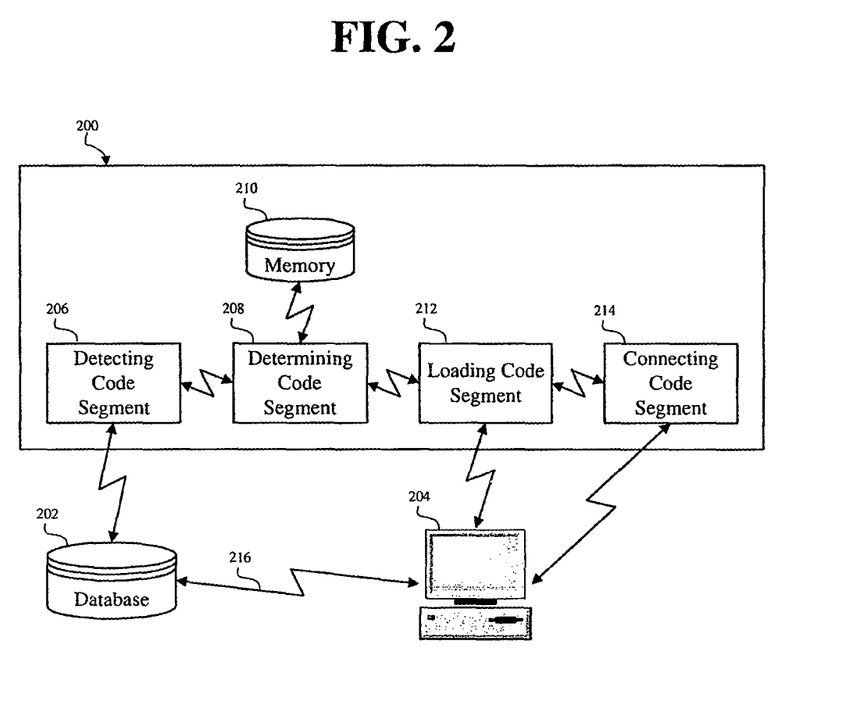
FIG. 2 is a schematic of an embodiment of a computer-readable medium for accessing a database with a terminal, according to an aspect of the present disclosure.

A tangible computer-readable medium 200 encoded with an executable set of instructions for accessing a database 202 with a terminal 204 is generally indicated in FIG. 2.

The tangible computer-readable medium 200 includes a detecting code segment 206 that, when executed, detects connection properties of the database. In an embodiment of the computer-readable medium 200, the connection properties include a hostname, port number, database name, username, and password. However, those skilled in the art appreciate that additional embodiments of the computer-readable medium 200 may include additional, and/or alternative, connection properties.

A determining code segment 208, when executed, automatically determines, based on the connection properties of the database 202, one of a plurality of database connectivity drivers that enables communication with the database 202. The one of the plurality of database connectivity drivers is automatically determined from a plurality of database connectivity drivers that are stored in a memory 210. The database connectivity drivers may be Java Database Connectivity drivers, Open Database Connectivity drivers, or any other database connectivity drivers that are generally known and understood. Furthermore, in an embodiment of the computer-readable medium 200, the database connectivity drivers may include a combination of Java Database Connectivity drivers, Open Database Connectivity drivers, and any other database connectivity drivers that are generally known and understood.

In an embodiment of the computer-readable medium 200, each of the database connectivity drivers is aggregated into one of a Java Archive file, a ZIP file, or any other type of file generally known and understood. In an alternative embodiment of the computer-readable medium 200, the database connectivity drivers comprise a combination of Java Archive files, ZIP files, and any other type of file generally known and understood.

In a further embodiment of the computer-readable medium 200, the database connectivity drivers support at least My Structured Query Language, Oracle, DB2, and Structured Language Server. However, those skilled in the art appreciate that, in additional embodiments, the database connectivity drivers support additional database management systems.

A loading code segment 212, when executed, loads the one of the database connectivity drivers that is determined to correspond to the connection properties of the database 202 on the terminal 204 to enable the terminal 204 to communicate with the database 202. In an embodiment of the computer-readable medium 200, wherein the one of the database connectivity drivers that is determined to correspond to the connection properties of the database 202 is aggregated into a Java Archive file, the loading code segment 212 extracts the one of the database connectivity drivers from the Java Archive file before loading the one of the database connectivity drivers on the terminal 204.

In an embodiment of the computer-readable medium 200, the loading code segment 212 automatically loads and configures the one of the database connectivity drivers that is determined to correspond to the connection properties of the database 202 on the terminal 204 in response to the determining code segment 208 automatically determining the one of the database connectivity drivers.

In a further embodiment of the computer-readable medium 200, as shown in FIG. 2, the computer-readable medium 200 includes the memory 210 that stores the plurality of java database connectivity drivers. In this regard, the loading code segment 212 loads the one of the database connectivity drivers that is determined to correspond to the connection properties of the database 202 on the terminal 204 without the one of the plurality of database connectivity drivers being provided externally of the computer-readable medium 200.

A connection establishing code segment 214, when executed, establishes a connection between the terminal 204 and the database 202. The connection is established based on a uniform resource locator (URL) string of the database 202. In an embodiment of the computer-readable medium 200, the URL string of the database 202 is pre-encoded in the computer-readable medium 200 for establishing the connection between the terminal 204 and the database 202 without requiring input of the URL string at the terminal 204. The URL string may be pre-encoded in the database connectivity drivers or in the memory 210.

Figure 3:
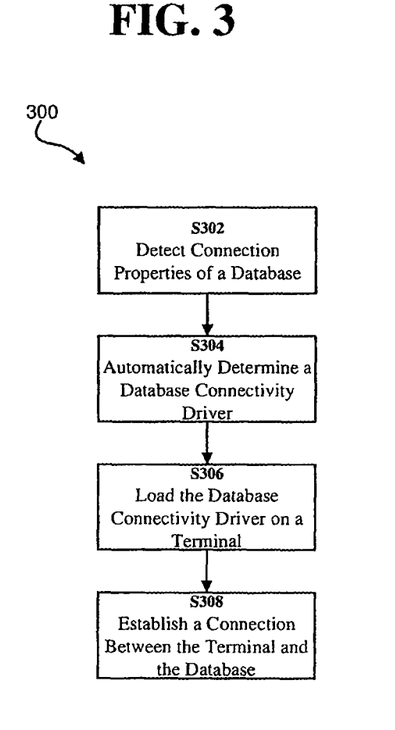
FIG. 3 is a flowchart of an embodiment of a method for accessing a database with a terminal, according to an aspect of the present disclosure.

A method 300 for accessing a database with a terminal is generally shown in FIG. 3. The method includes detecting connection properties of the database at step S302. In an embodiment of the method 300, the connection properties include a hostname, port number, database name, username, and password. However, those skilled in the art appreciate that, in additional embodiments, the method 300 may include additional, and/or alternative, connection properties.

One of a plurality of database connectivity drivers that enables communication with the database is automatically determined, based on the connection properties, from a plurality of database connectivity drivers at step S304. The plurality of database connectivity drivers are stored in a memory. In an embodiment of the method 300, the terminal includes the memory that stores the plurality of database connectivity drivers. The database connectivity drivers may be Java Database Connectivity drivers, Open Database Connectivity drivers, or any other database connectivity drivers that are generally known and understood. Additionally, or alternatively, the database connectivity drivers may include a combination of Java Database Connectivity drivers, Open Database Connectivity drivers, and any other database connectivity drivers that are generally known and understood.

In an embodiment of the method 300, each of the database connectivity drivers is aggregated into one of a Java Archive file, a ZIP file, or any other type of file generally known and understood. In an alternative embodiment of the method 300, the database connectivity drivers comprise a combination of Java Archive files, ZIP files, and any other type of file generally known and understood. In a further embodiment of the method 300, the database connectivity drivers support at least My Structured Query Language, Oracle, DB2, and Structured Language Server. However, those skilled in the art appreciate that, in additional embodiments, the database connectivity drivers support additional database management systems.

The one of the plurality of database connectivity drivers that is automatically determined to correspond to the connection properties of the database is loaded on the terminal at step S306. In the embodiment of the method 300 wherein the terminal includes the memory, the one of the plurality of database connectivity drivers is loaded on the terminal without the one of the plurality of database connectivity drivers being provided externally of the terminal. In the embodiment of the method 300 wherein the one of the plurality of database connectivity drivers is aggregated in a Java Archive file, the one of the plurality of database connectivity drivers is extracted from the Archive file before the file is loaded on the terminal. In a further embodiment of the method 300, the one of the plurality of database connectivity drivers is automatically loaded and configured on the terminal at step S306 in response to the automatically determining the one of the plurality of database connectivity drivers at step S304.

In an embodiment of the method 300, as shown in FIG. 3, a connection is established between the terminal and the database based on a URL string of the database at step S308. In this regard, the URL string is stored in one of the terminal and the memory and the connection is established at step S308 without requiring input of the URL string at the terminal.

Figure 4:
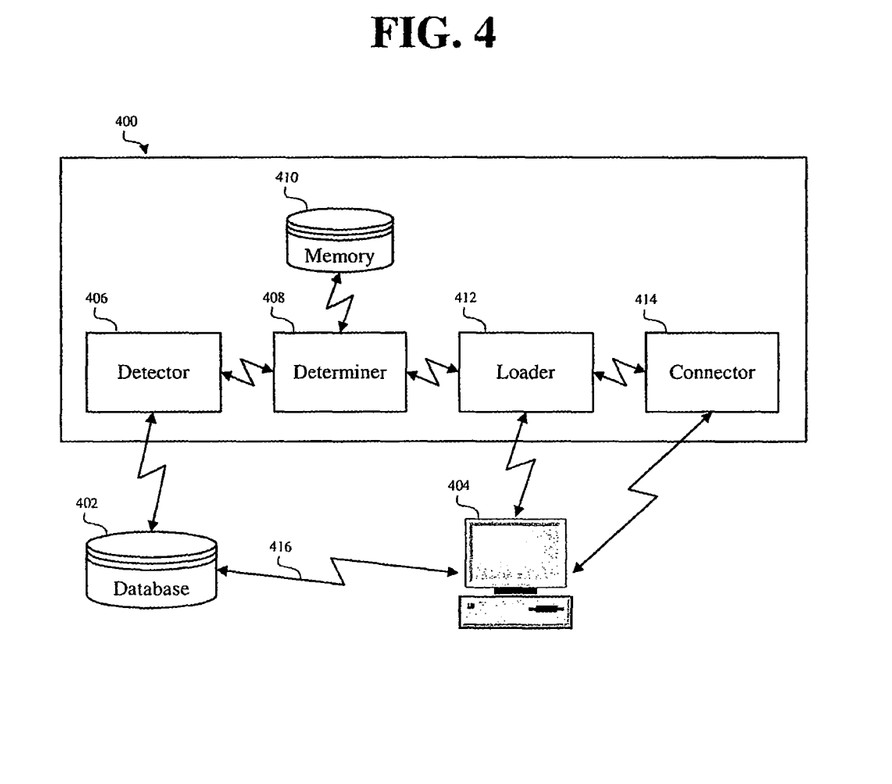
FIG. 4 is a schematic of an embodiment of a system for accessing a database with a terminal, according to an aspect of the present disclosure.

An apparatus 400 for accessing a database 402 with a terminal 404 is generally indicated in FIG. 4.

The apparatus includes a detector 406 that detects connection properties of the database 402. The connection properties may include a hostname, port number, database name, username, and password. However, those skilled in the art appreciate that additional, or alternative, connection properties may also be included.

A determiner 408 automatically determines, based on the connection properties of the database 402, one of a plurality of database connectivity drivers that enables communication with the database 402. The determiner 408 automatically determines the one of the plurality of database connectivity drivers from a plurality of database connectivity drivers that are stored in a memory 410. The database connectivity drivers may be Java Database Connectivity drivers, Open Database Connectivity drivers, any other database connectivity drivers that are generally known and understood, or any combination thereof. The database connectivity drivers may be aggregated into one of a Java Archive file, a ZIP file, any other type of file generally known and understood, or any combination thereof. The database connectivity drivers support at least My Structured Query Language, Oracle, DB2, and Structured Language Server. However, those skilled in the art appreciate that, in additional embodiments, the database connectivity drivers support additional database management systems.

A loader 412 loads the one of the database connectivity drivers that is determined to correspond to the connection properties of the database 402 on the terminal 404 to enable the terminal 404 to communicate with the database 402. In an embodiment of the apparatus 400, wherein the one of the database connectivity drivers that is determined to correspond to the connection properties of the database 402 is aggregated into a Java Archive file, the loader 412 extracts the one of the database connectivity drivers from the Java Archive file before loading the one of the database connectivity drivers on the terminal 404.

In an embodiment of the apparatus 400, the loader 412 automatically loads and configures the one of the database connectivity drivers that is determined to correspond to the connection properties of the database 402 on the terminal 404 in response to the determiner 408 automatically determining the one of the database connectivity drivers.

In a further embodiment of the apparatus 400, as shown in FIG. 4, the apparatus 400 includes the memory 410 that stores the plurality of java database connectivity drivers. In this regard, the loader 412 loads the one of the database connectivity drivers that is determined to correspond to the connection properties of the database 402 on the terminal 404 without the one of the plurality of database connectivity drivers being provided externally of the apparatus 400.

In an embodiment of the apparatus 400, as shown in FIG. 4, a connector 414 establishes a connection between the terminal 404 and the database 402. The connection is established based on a uniform resource locator URL string of the database 402. In an embodiment of the apparatus 400, the URL string of the database 202 is pre-encoded in the apparatus 400 for establishing the connection between the terminal 404 and the database 402 without requiring input of the URL string at the terminal 404. The URL string may be pre-encoded in the database connectivity drivers or the memory 410.

Accordingly, the present invention enables a terminal to be configured to access a database without requiring a developer of the database to provide a specific database connectivity driver and without requiring manually searching for a specific database connectivity driver. The present invention detects the connection properties of the database, automatically determines the specific database connectivity driver that enables communication with the database based on the connection properties, and loads the specific database connectivity driver on the terminal to enable the terminal to communicate with the database. According to an embodiment of the present invention, all database connectivity drivers are included and registered within a memory, and thus, the specific database connectivity driver does not need to be provided externally of the memory. Furthermore, in an additional embodiment of the present invention, the URL string that is required to connect to the database is pre-configured within the memory, and thus, a user of the terminal does not need to know the exact URL string.

Accordingly, the present invention improves productivity among database developers as it eliminates the need for providing the specific database connectivity driver. The present invention serves as a standard for accessing any database, and thus, eliminates the need for clients to manually configure a terminal for accessing a database. Many databases have individual client software that can only connect to a specific type of database. The present invention servers as a universal client for connecting or issuing any database commands.

The present invention benefits developers as well as those who have no knowledge of databases as non-technical users can issue commands if needed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the present invention has primarily been described with reference to database connectivity drivers. Those skilled in the art appreciate that the database connectivity drivers may comprise Java Database Connectivity drivers, Open Database Connectivity drivers, a combination thereof, or any other type of driver commonly known and understood in the art. Moreover, those skilled in the art further appreciate that each database connectivity driver may be aggregated into a Java Archive file, ZIP file, or other file format.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for configuring a terminal to access a database, the system comprising:
a processor; and
a memory storing instructions that, when executed by the processor, cause the processor to perform operations including:
determining connection properties of the database, the database being accessible via a uniform resource locator string;
determining, based on the connection properties of the database and from a plurality of database connectivity drivers, one of the plurality of database connectivity drivers that enables a connection with the database; and
providing the one of the plurality of database connectivity drivers to the terminal via a network,
wherein the one of the plurality of database connectivity drivers comprises the uniform resource locator string and is configured to establish the connection with the database via the network based on the uniform resource locator string to enable communication between the terminal and the database.

2. The system according to claim 1, wherein the instructions, when executed by the processor, cause the processor to further perform:
loading the one of the plurality of database connectivity drivers on the terminal for establishing the connection between the terminal and the database.

3. The system according to claim 2, wherein the uniform resource locator is pre-encoded in the one of the plurality of database connectivity drivers for establishing the connection with the database via the network based on the uniform resource locator string without requiring input of the uniform resource locator string at the terminal.

4. The system according to claim 1, wherein the one of the plurality of database connectivity drivers is configured to establish the connection with the database via the network based on the uniform resource locator string without requiring input of the uniform resource locator string at the terminal.

5. The system according to claim 1, wherein the uniform resource locator is stored in the one of the plurality of database connectivity drivers.

6. The system according to claim 1, wherein the uniform resource locator is stored in the memory.

7. The system according to claim 1, wherein each of the plurality of database connectivity drivers is stored in the memory.

8. The system according to claim 7, wherein
the plurality of database connectivity drivers is aggregated into a single file in the memory, the single file having an archive file format, and
the instructions, when executed by the processor, cause the processor to further perform:
extracting the one of the plurality of database connectivity drivers from the single file before providing the one of the plurality of database connectivity drivers to the terminal via the network.

9. The system according to claim 1, wherein the connection properties include one of a hostname, a port number, a database name, a user name, and a password.

10. The system according to claim 1, wherein the plurality of database connectivity drivers supports a plurality of relational database management systems.

11. A method for configuring a terminal to access a database, the method comprising:
- determining connection properties of the database, the database being accessible via a uniform resource locator string;
- determining, based on the connection properties of the database and from a plurality of database connectivity drivers, one of the plurality of database connectivity drivers that enables a connection with the database; and
- providing the one of the plurality of database connectivity drivers to the terminal via a network,
- wherein the one of the plurality of database connectivity drivers comprises the uniform resource locator string and is configured to establish the connection with the database via the network based on the uniform resource locator string to enable communication between the terminal and the database.

12. The method according to claim 11, further comprising:
- loading the one of the plurality of database connectivity drivers on the terminal for establishing the connection between the terminal and the database.

13. The method according to claim 12, wherein the uniform resource locator is pre-encoded in the one of the plurality of database connectivity drivers for establishing the connection with the database via the network based on the uniform resource locator string without requiring input of the uniform resource locator string at the terminal.

14. The method according to claim 11, wherein the one of the plurality of database connectivity drivers is configured to establish the connection with the database via the network based on the uniform resource locator string without requiring input of the uniform resource locator string at the terminal.

15. The method according to claim 11, wherein
- the plurality of database connectivity drivers supports a plurality of relational database management systems,
- each of the plurality of database connectivity drivers is stored in the memory,
- the plurality of database connectivity drivers is aggregated into a single file in the memory, the single file having an archive file format, and
- the method further comprises:
  - extracting the one of the plurality of database connectivity drivers from the single file before providing the one of the plurality of database connectivity drivers to the terminal via the network.

16. A non-transitory computer-readable medium having an executable computer program for configuring a terminal to access a database that, when executed by a processor, causes the processor to perform operations comprising:
- determining connection properties of the database, the database being accessible via a uniform resource locator string;
- determining, based on the connection properties of the database and from a plurality of database connectivity drivers, one of the plurality of database connectivity drivers that enables a connection with the database; and
- providing the one of the plurality of database connectivity drivers to the terminal via a network,
- wherein the one of the plurality of database connectivity drivers comprises the uniform resource locator string and is configured to establish the connection with the database via the network based on the uniform resource locator string to enable communication between the terminal and the database.

17. The non-transitory computer-readable medium according to claim 16, the operations further comprising:
- loading the one of the plurality of database connectivity drivers on the terminal for establishing the connection between the terminal and the database.

18. The non-transitory computer-readable medium according to claim 17, wherein the uniform resource locator is pre-encoded in the one of the plurality of database connectivity drivers for establishing the connection with the database via the network based on the uniform resource locator string without requiring input of the uniform resource locator string at the terminal.

19. The non-transitory computer-readable medium according to claim 16, wherein the one of the plurality of database connectivity drivers is configured to establish the connection with the database via the network based on the uniform resource locator string without requiring input of the uniform resource locator string at the terminal.

20. The non-transitory computer-readable medium according to claim 16, wherein
- the plurality of database connectivity drivers supports a plurality of relational database management systems,
- each of the plurality of database connectivity drivers is stored in the memory,
- the plurality of database connectivity drivers is aggregated into a single file in the memory, the single file having an archive file format, and
- the operations further comprise:
  - extracting the one of the plurality of database connectivity drivers from the single file before providing the one of the plurality of database connectivity drivers to the terminal via the network.

* * * * *